United States Patent [19]

Hayashi

[11] Patent Number: 4,605,968

[45] Date of Patent: Aug. 12, 1986

[54] DIRECT BROADCASTING SATELLITE RECEIVER

[75] Inventor: Toshihide Hayashi, Tokyo, Japan

[73] Assignee: Sony Corporation, Tokyo, Japan

[21] Appl. No.: 632,614

[22] Filed: Jul. 19, 1984

[30] Foreign Application Priority Data

Jul. 21, 1983 [JP]  Japan .......................... 58-113542[U]

[51] Int. Cl.$^4$ ........................ H04N 5/50; H04N 5/445
[52] U.S. Cl. .................................... 358/188; 358/183; 358/192.1
[58] Field of Search ................... 358/188, 183, 22, 10, 358/192.1; 455/154

[56] References Cited

U.S. PATENT DOCUMENTS

| | | | |
|---|---|---|---|
| 4,189,750 | 2/1980 | Sadel | 358/188 |
| 4,214,273 | 7/1980 | Brown | 358/188 |
| 4,340,908 | 7/1982 | Wakabayashi | 358/188 |
| 4,366,502 | 12/1982 | Shiu | 358/192.1 |

FOREIGN PATENT DOCUMENTS

| | | | |
|---|---|---|---|
| 15419 | 5/1972 | Japan | 358/192.1 |
| 38252 | 9/1972 | Japan | 358/192.1 |

Primary Examiner—Tommy P. Chin
Attorney, Agent, or Firm—Lewis H. Eslinger; Alvin Sinderbrand

[57] ABSTRACT

A direct broadcasting satellite receiver including an indoor unit for receiving a broadcasting wave transmitted from a stationary artificial satellite through an antenna installed outdoors, a signal input terminal provided at the indoor unit to which the output signal from the antenna is supplied through a signal cable, a demodulating circuit for demodulating the input signal at the input terminal into a television signal, a level detecting circuit for resultantly detecting the signal level at the input terminal and a signal superimposing circuit for superimposing the output signal from the level detecting circuit upon the output signal of the demodulating circuit, whereby the input signal level at the input terminal is displayed on the television picture screen.

6 Claims, 5 Drawing Figures

DIRECT BROADCASTING SATELLITE RECEIVER

BACKGROUND OF THE INVENTION

1. Field of the Invention

The present invention generally relates to a direct broadcasting satellite receiver and more particularly is directed to a direct broadcasting satellite receiver capable of efficiently adjusting the receiving direction of its antenna for receiving a satellite broadcasting wave without using any special measuring apparatus.

2. Description of the Prior Art

Recently, a satellite broadcasting system has been realized which employs an artificial satellite existing on a stationary orbit to carry out television broadcasting.

A satellite broadcasting wave is an electrical wave in SHF (superhigh frequency) band, for example, about 12 GHz which comes from FM (frequency-modulation-)—modulating a television signal.

FIG. 1 is a block diagram showing an example of a prior art receiving system of an SHF satellite television broadcasting wave.

An SHF signal transmitted is formed as follows. That is, a television audio signal is converted to a PCM (pulse code modulated) signal, and this PCM audio signal or data is divided into blocks at every predetermined time and added with an error correction code. Thereafter, the PCM signal is 4-phase-phase-shift-keying modulated on a subcarrier frequency of 5.73 MHz to become a signal which occupies the higher frequency side of an analog video signal as shown in FIG. 2. The modulated PCM signal and the analog video signal are combined with each other and then the composite signal is FM-modulated so as to become the SHF signal with the frequency of about 12 GHz.

This SHF broadcasting wave is received by a receiving parabola antenna 1 of the receiving system shown in FIG. 1. The signal of the SHF band received by the receiving antenna 1 is supplied to an outdoor unit or S-U converter 2 in which it is converted in frequency to a signal of UHF (ultra high frequency) band of, for example, about 1 GHz as a first intermediate frequency signal. The signal of UHF band is supplied through a coaxial cable 3 to a tuner 11 in an indoor unit 10. The tuner 11 receives from a channel-selecting circuit 12 a channel-selecting signal corresponding to a channel-selecting operation made by a viewer. As a result, this tuner 11 produces a broadcasting wave or signal (UHF signal) corresponding to the selected channel in the form of a second intermediate frequency signal. The second intermediate frequency signal is supplied through a band-pass filter 13 to a second intermediate frequency amplifier 14. The output from the second intermediate frequency amplifier 14 is supplied to an AGC (automatic gain control) voltage detecting circuit 15 which produces an AGC voltage. This AGC voltage is fed back to the amplifier 14 so that the amplifier 14 is controlled in AGC operation so as to make its output constant.

The output from the second intermediate frequency amplifier 14 is supplied to an FM demodulating circuit 16 and then FM-demodulated. The FM-demodulated output therefrom is supplied to a video amplifier 17 so that a video signal is developed thereby and delivered to an output terminal 18.

The output from the FM demodulating circuit 16 is also supplied to a band-pass filter 21 from which an audio subcarrier component is extracted. The audio subcarrier component thus extracted is supplied to a 4-phase-phase-shift keying signal demodulating circuit 22, in which the audio PCM signal is demodulated and which then is fed to a digital decoder 23. In this digital decoder 23, after the error of the PCM signal, which can be corrected by the error correction code, is corrected, the PCM signal is restored to the original time series and then re-converted to the analog audio signal. The analog audio signal from the digital decoder 23 is delivered to an audio output terminal 24.

The audio signal from the digital decoder 23 and the video signal from the video amplifier 17 are both supplied to an AM (amplitude modulation)-modulating circuit 19 which produces a signal modulated to a television broadcasting wave or signal of a particular vacant channel in VHF (very high frequency) band television broadcasting. This signal is delivered to an output terminal 20.

Accordingly, if the signal developed at the output terminal 20 is supplied to the antenna terminal of a home television receiver which is widely used, the satellite television broadcasting can be viewed by this television receiver at the particular vacant channel.

By the way, in the satellite broadcasting receiving system, the receiving parabola antenna 1 must be adjusted such that the direction thereof is directed so as to accurately face the artifical satellite. In this case, the adjusting of the direction of the receiving parabola antenna 1 requires high accuracy calculated down to first decimal place, for example, 30.5°. The direction of the antenna is usually adjusted while inspecting the input level of the received signal. In this case, a special measuring apparatus is used because the adjustment of the receiving antenna must be carried out with high accuracy. In addition, when the direction of the antenna for receiving the satellite broadcasting wave is adjusted, it is necessary to adjust not only the azimuth angle thereof but also the elevation angle thereof. Thus, it takes much time to detect the optimum receiving direction of the antenna by merely measuring the level of the received signal and thus it is very troublesome to adjust the direction of the receiving antenna.

OBJECTS AND SUMMARY OF THE INVENTION

Accordingly, it is an object of the present invention to provide an improved direct broadcasting satellite receiver.

It is another object of the present invention to provide a direct broadcasting satellite receiver capable of efficiently adjusting the elevation angle and azimuth angle of an antenna for receiving a satellite broadcasting wave in a short time of period without using a special measuring apparatus.

It is a further object of the present invention to provide a direct broadcasting satellite receiver which enables even an amateur viewer oneself to easily adjust the direction of a satellite broadcasting receiving antenna in a short time at optimum.

According to one aspect of the present invention, there is provided a direct broadcasting satellite receiver comprising:
   an indoor unit for receiving a broadcasting wave transmitted from a stationary artificial satellite through antenna means installed outdoors;

a signal input terminal provided at said indoor unit to which a signal from said antenna means is supplied through a signal cable;

a demodulating circuit for demodulating the input signal at said signal input terminal into a television signal;

a level detecting circuit for resultantly detecting a signal level at said signal input terminal; and signal superimposing means for superimposing an output signal from said level detecting circuit upon an output signal from said demodulating circuit, whereby the input signal level at said input terminal is displayed on a television picture screen of a television receiver.

The other objects, features and advantages of the present invention will become apparent from the following description taken in conjunction with the accompanying drawings through which the like references designate the same elements and parts.

DESCRIPTION OF THE PREFERRED EMBODIMENT

Now, an embodiment of a direct broadcasting satellite receiver according to the present invention will hereinafter be described with reference to the drawings.

Figure 1:
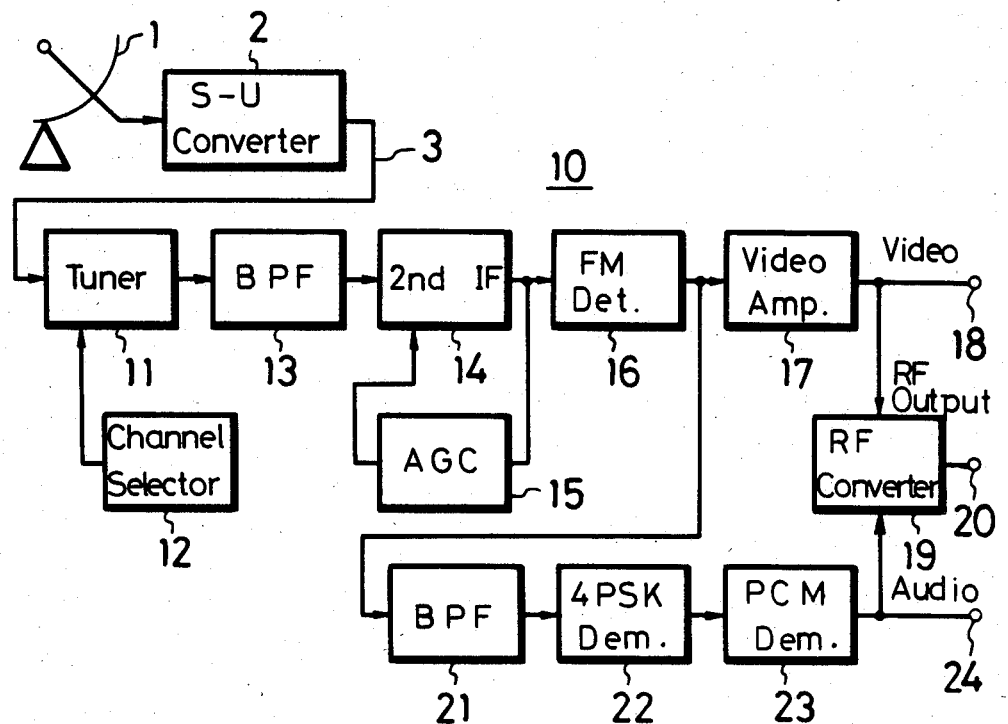
FIG. 1 is a systematic block diagram showing an example of a prior art satellite broadcasting receiving system.
Figure 2:
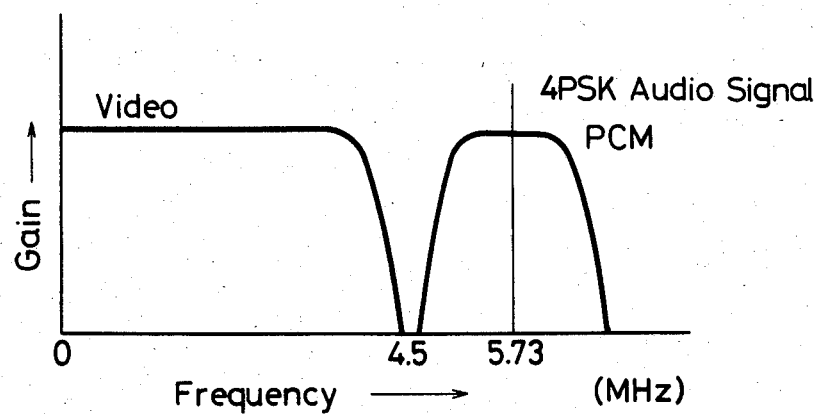
FIG. 2 is a diagram useful for explaining a satellite broadcasting wave.
Figure 3:
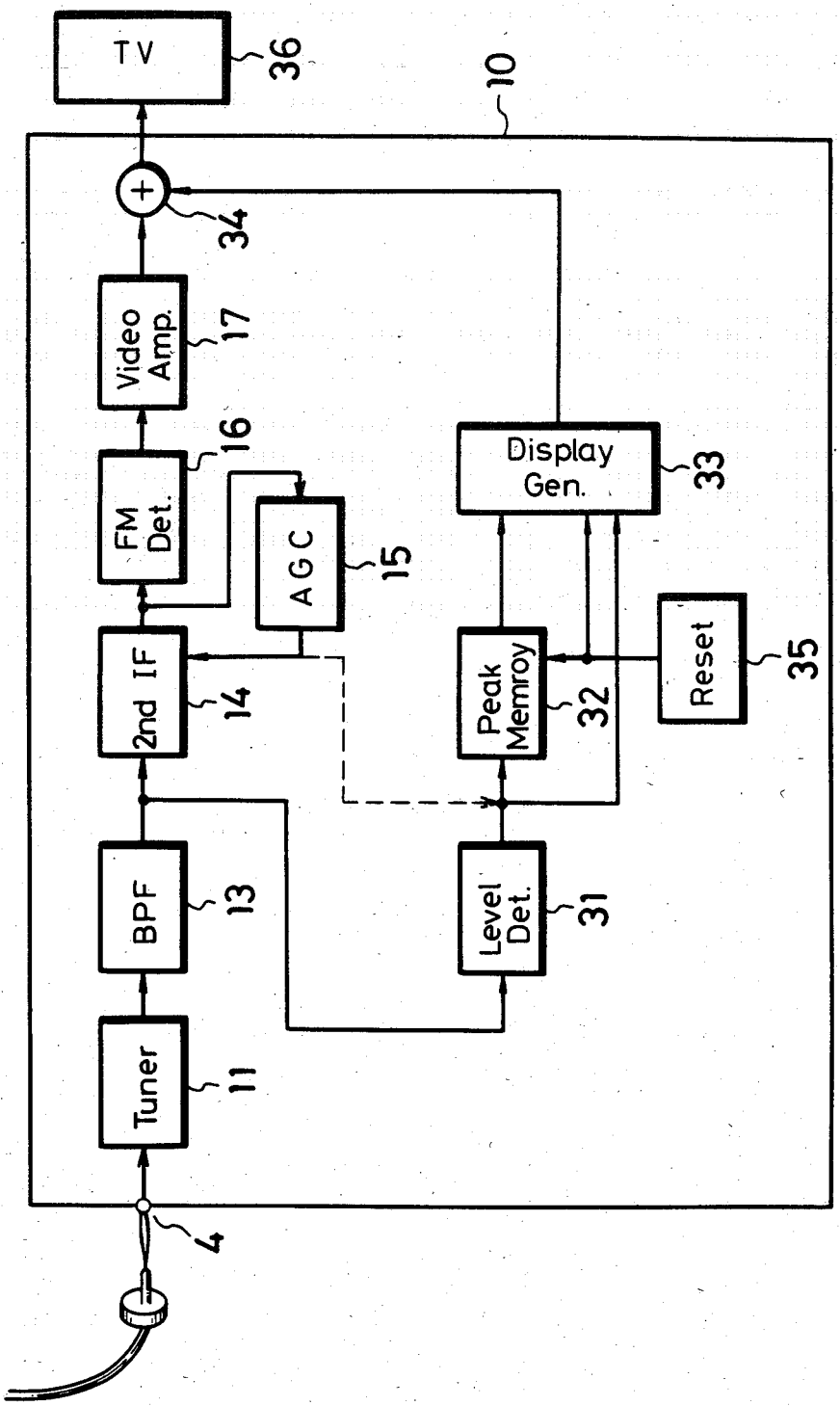
FIG. 3 is a systematic block diagram showing a main part of an embodiment of a direct broadcasting satellite receiver according to the present invention.

FIG. 3 is a block diagram showing a main part of an embodiment of the direct broadcasting satellite receiver according to the present invention. In FIG. 3, like parts corresponding to those in FIG. 1 are marked with the same references and hence will not be described in detail.

In FIG. 3, reference numeral 4 designates an input terminal which is provided in the indoor unit 10. The signal received by the parabola antenna 1 (refer to FIG. 1) is amplified and converted by the S-U converter 2 (refer to FIG. 1) and supplied through a signal cable 3 (refer to FIG. 1) to the input terminal 4. Since this input terminal 4 is provided at the stage prior to the AGC amplifier 15, the amplitude (or potential at the pedestal portion) of the signal fed to the input terminal 4 is not yet stabilized and fluctuates depending on the direction of the parabola antenna 1. That is, when the parabola antenna 1 is oriented in the optimum direction, the level of the signal at the input terminal 4 becomes the maximum value. Accordingly, if the level of the signal at this point (terminal 4) or the point where a signal level is proportional to the former is detected and the azimuth angle and elevation angle of the antenna 1 are determined so as to make the value of the level be maximum, the antenna 1 can be set in the optimum direction.

In the embodiment of the invention shown in FIG. 3, the output signal from the band-pass filter 13, by way of example, is supplied to a level detector 31 and then to thereby indirectly detect the level of the signal at the input terminal 4. Instead of using the level detector 31, even if the AGC output from the AGC amplifier 15 is used as it is, the level of the signal at the input terminal 4 can be resultantly detected. The detected output from the level detector 31 is supplied to a peak value memory circuit 32 and also to a drive circuit 33. The peak value memory circuit 32 inspects the AM-detected output at all times and compares the level of the signal previously stored with the detected level value of the level of the received signal at that time. And, when the detected level value is higher than the former, the stored content in the memory circuit 32 is re-written by the higher detected level value. Accordingly, the peak (highest) level value in the received signal levels is always stored in the peak value memory circuit 32. The level value stored in the peak value momory circuit 32 is also supplied to the display generator 33.

The display generator 33 includes a character generator, in which an analog input signal derived from the level detector 31 is converted to a corresponding video signal which indicates the level of input signal as a bar graph or alpha-numeric on-screen. The converted signal therefrom is supplied to a signal superimposing circuit 34 at its one input terminal. The other input terminal of the signal superimposing cirucit 34 is connected to the output terminal of the video amplifier 17. In the signal superimposing circuit 34, the signal from the drive circuit 33 is superimposed upon the video signal from the video amplifier 17 and then supplied to a display apparatus 36 to be displayed as the level of the input signal in the form of a graph or numerical value. In this case, both of the signals may not alway be displayed at the same time but only the signal from, for example, the drive circuit 33 may temporarily be displayed on the display apparatus 36.

Reference numeral 35 designates a reset circuit which controls the operations of the peak value memory circuit 32 and the drive circuit 33. Upon adjusting the direction of the antenna 1, when a button (not shown) provided in connection with the reset circuit 35 is operated or depressed, the reset circuit 35 produces the set signal by which the peak value memory circuit 32 and the drive circuit 33 are both set to the operation mode. Next, at the time when the direction of the antenna 1 is adjusted and the setting of the antenna 1 is ended, the button is again depressed to allow the reset circuit 35 to produce the reset signal by which the operation modes of the peak value memory circuit 32 and the drive circuit 33 are ended to clear up the content of the peak value memory circuit 32. At this time, the display on the picture screen disappears. As described above, when the antenna 1 is set, not only the input signal level at this time but also the maximum level value of the input signals up to this time are displayed on the display apparatus 36 by the drive circuit 33.

The display apparatus 36 may be an ordinary television receiver or monitor receiver and provided independently from the indoor unit 10. Also it is possible to use a special television receiver which is provided integral with the indoor unit 10 and so on.

In the embodiment of the present invention shown in FIG. 3, although the band-pass filter 21, demodulating circuit 22, decoder 23 and so on for providing the analog audio signal are not shown in the figure, they are of course provided in the example of FIG. 3.

Figure 4:
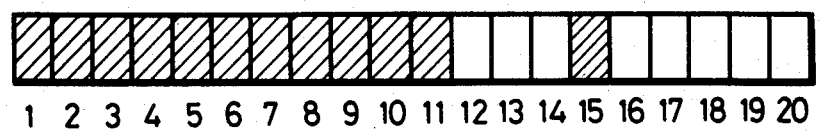
FIG. 4 is a diagram showing an example of a display apparatus used in the present invention.

FIG. 4 shows an example of the dispaly pattern made on the display apparatus 36, in which 20 steps of levels from level "1" to "20" can be dispalyed thereon. In FIG. 4, hatched portions represent portions which are brilliantly brightened, and FIG. 4 shows a case in which the input signal level at that time is "11" and the peak value up to that time is "15".

The direction of the receiving antenna 1 can be adjusted by using the display as follows.

Since the position of the artificial satellite is determined, the azimuth angle and the elevation angle of the receiving antenna 1 at the site where the receiving antenna 1 is installed are roughly determined, respectively. Changing, for example, the azimuth angle of the receiving antenna 1 from this position, a peak value at the azimuth angle of the receiving antenna 1 which is applied with the strongest wave is stored in and then displayed on the display apparatus 36. Therefore, this time, the receiving antenna 1 is rotated in the opposite direction so as to get the peak value and then to detect the azimuth angle at which the input signal level becomes coincident with the peak value. When that position is detected, at that detected azimuth angle, while changing the elevation angle of the receiving antenna 1, the elevation angle at which the peak value is obtained is similarly detected by the display apparatus 36. When that elevation angle is detected, changing the azimuth angle of the receiving antenna 1 at that elevation angle, the position at which the peak value becomes larger is found out. By repeating a series of the above several times, the azimuth angle and the elevation angle of the antenna 1 at which the optimum receiving direction of the antenna 1 is established can be detected.

The display is performed on the picture screen and also may be performed on the front panel portion of the indoor unit by using an LED (light emission diode) or a phosphor display tube which is independently provided.

Figure 5:
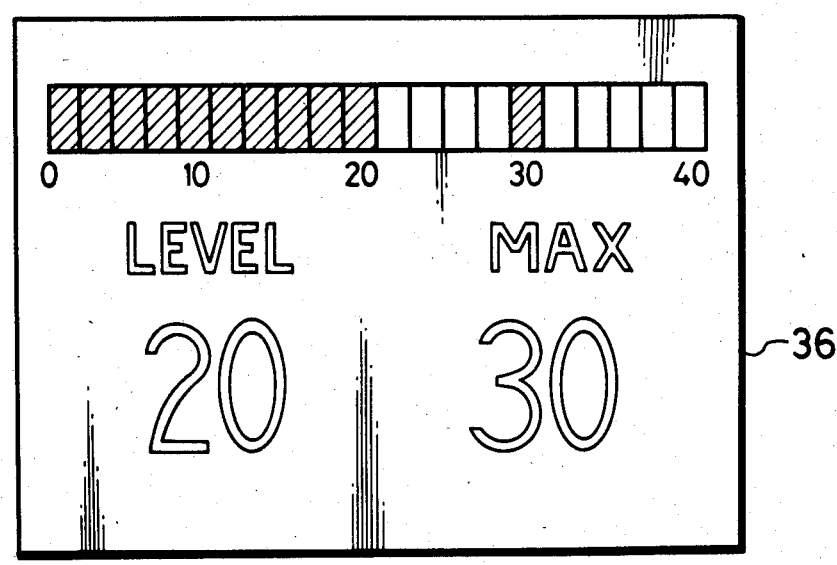
FIG. 5 is a diagram showing another example of the display apparatus used in the present invention.

FIG. 5 is a diagram showing another example of the display apparatus 36. In the illustrated example of the display apparatus on FIG. 5, a bar graph is used and together with this bar graph, the level value is displayed as its numerical value. And, also it is possible that only the numerical value is displayed.

As set forth above, according to the present invention, since the input level of the received signal and the peak level thereof are displayed on the picture screen of the cathode ray tube (CRT), the optimum receiving direction of the satellite broadcasting receiving antenna can be adjusted very easily and also in a short time because the peak value is known. Thus, without using the special measuring apparatus, even an amateur viewer for the satellite broadcasting can adjust the receiving direction of the satellite broadcasting receiving autenna at optimum by oneself.

Moreover, according to the present invention, since the input level of the received signal is displayed on the picture screen, the input level can be displayed in a large area, requiring no other particular display elements. In addition, as the character generator, the one which is used to display the channel on the picture screen can be used.

The above description is given on a single preferred embodiment of the invention, but it will be apparent that many modifications and variations could be effected by one skilled in the art without departing from the spirit or scope of the novel concepts of the invention, so that the scope of the invention should be determined by the appended claims only.

We claim as our invention:

1. A direct broadcasting satellite receiver for receiving a broadcasting wave transmitted from a stationary artificial satellite through antenna means installed outdoors comprising:

a signal input terminal to which a signal from said antenna means is supplied through a signal cable;

a demodulating circuit for demodulating the signal fed in at said signal input terminal into a television signal;

a level detecting circuit for detecting a signal level of said signal fed in at said signal input terminal and producing an output signal representing said signal level;

a peak value holding circuit for holding the maximum value of the output level of said level detecting circuit output signal and producing a signal representing said maximum value;

a display generator for developing video signals responsive to an output signal from said level detecting circuit and said signal representing said maximum value from said peak value holding circuit; and signal superimposing means for superimposing said video signals from said display generator upon said television signal from said demodulating circuit, whereby the input signal level at said input terminal and a maximum value of the output level from the level detecting circuit are displayed on a television picture screen.

2. A direct broadcasting satellite receiver according to claim 1, wherein said display generator includes means for displaying said signal level and said maximum value on the picture screen as a bar graph.

3. A direct broadcasting satellite receiver according to claim 1, wherein said display generator includes means for displaying said signal level and said maximum value on said picture screen as numerals.

4. A direct broadcasting satellite receiver according to claim 1, wherein said level detecting circuit is connected to detect the signal level of an output from an automatic gain control circuit provided in said demodulating circuit.

5. A direct broadcasting satellite receiver according to claim 1, wherein said signal superimposing means includes means for blanking television signals, whereby when said input signal level and said maximum value are displayed on said picture screen, a television signal is blanked and only said input signal level and said maximum value are displayed on said picture screen.

6. A direct broadcasting satellite receiver according to claim 1, wherein said signal superimposing means includes means for displaying said input signal level and said maximum value superimposed upon a television signal.

* * * * *